B. F. UPHAM.
FASTENER FOR SECURING PRINTING PLATES TO TYPE BEDS.
APPLICATION FILED DEC. 26, 1908.
921,753.
Patented May 18, 1909.
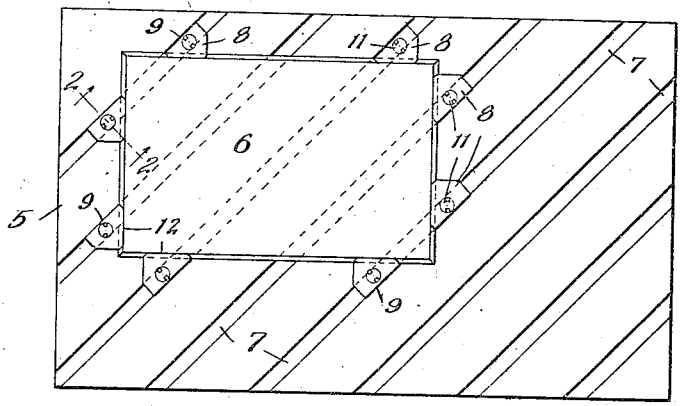
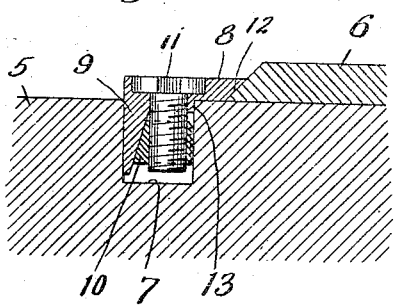 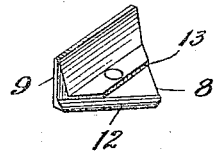 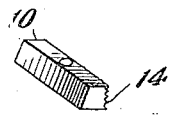
Witnesses:
Wm. Geiger
H. W. Munday
Inventor:
Burt F. Upham
By Munday, Evarts, Adcock & Clarke.

UNITED STATES PATENT OFFICE.

BURT F. UPHAM, OF BOSTON, MASSACHUSETTS.

FASTENER FOR SECURING PRINTING-PLATES TO TYPE-BEDS.

No. 921,753.	Specification of Letters Patent.	Patented May 18, 1909.

Application filed December 26, 1908. Serial No. 469,360.

*To all whom it may concern:*

Be it known that I, BURT F. UPHAM, a citizen of the United States, residing in Boston, in the county of Middlesex and State of Massachusetts, have invented a new and useful Improvement in Fasteners for Securing Printing-Plates to Type-Beds, of which the following is a specification.

This invention relates to the construction of fasteners or catches for securing plates to the type beds or cylinders of printing presses. Its object has been to produce a very simple and inexpensive form of fastening, which is capable of exerting a strong hold upon the plates and is easy both to attach, to release and to adjust.

The nature of the invention is fully explained below, and also illustrated in the accompanying drawing, in which latter—

Figure 1 is a plan of the type bed having a plate secured by my invention. Fig. 2 is a partial vertical section enlarged, on the line 2—2 of Fig. 1. Figs. 3 and 4 are perspective views of the parts of the catch.

In said drawing, 5 represents the type bed (or the surface of a type cylinder) to which an electrotype or other printing plate 6 has been attached by the use of my improved catches. The bed or cylinder is provided with diagonal channels 7 having vertical side walls in the usual manner, to receive and engage the catches. The latter consist of a top plate 8, a depending flange 9 integral with the depending plate, a nut 10, and a screw 11 passing through the plate and engaging the nut. The plate is triangular in shape, and at one edge 12 is beveled to fit the plate 6, as seen at Fig. 2, and the flange 9 is arranged along another of its edges. The outer face of the flange is vertical and fits squarely against the wall of the channel 7, while its inner face is beveled or inclined to adapt it to coact with the nut in tightening the catch in the channel 7, one edge of the nut being also inclined in the reverse direction as seen at Fig. 2. The outer surface 14 of the nut is vertical and provided with horizontal corrugations as shown so that when tightened, as stated below, it will have an increased grip upon the wall of the channel. Of course, it will be understood that the nut and flange can be entered freely in the channels, and that no tightening occurs until the wedging faces of the flange and nut are forced together by the screw. The top plate is drawn downward by the screw when the catch is to be secured in the bed, and the inclined opposing faces of the flange and nut then cause such an expansion of those devices as renders the catch very tight and secure in the channel. The plate is also provided with a lip 13 on its under face so that it is adapted to fit the channels 7, and the catch is thus adapted to be slid along the channels freely, a great convenience in positioning them.

It will be noted that my catch is composed of only a few separate parts, and that it embraces no superfluous metal.

I claim:

The catch for securing electrotype or similar plates adapted to be used in straight vertical sided channels in the bed, consisting of a top plate made triangular in shape, and having one edge beveled to fit the printing plate, and also having an integral flange depending from one edge into the channel of the bed, such flange being vertical on its outer side and wedging on its inner side, a nut having a corrugated vertical outer face and a wedging inner face to oppose the wedging face of the flange, and a screw passing down through the top plate and engaging the nut, and adapted to force said wedging faces together and cause expansion against the walls of the bed channel.

BURT F. UPHAM.

Witnesses:
PEARL ABRAMS,
H. M. MUNDAY.